United States Patent [19]

Cohen et al.

[11] 3,901,967
[45] Aug. 26, 1975

[54] SUSTAINED RELEASE OF ATROPINE

[75] Inventors: Arthur I. Cohen; James S. Y. Sim; Maurice H. Van Horn; Stanley E. Gordesky; Stanley I. Gordon, all of Rochester, N.Y.

[73] Assignee: Union Corporation, Verona, Pa.

[22] Filed: Sept. 10, 1973

[21] Appl. No.: 395,691

[52] U.S. Cl. .................................... 424/22; 424/81
[51] Int. Cl. .............................................. A61k 27/12
[58] Field of Search ........................... 424/19–22, 424/81

[56] References Cited
UNITED STATES PATENTS

| | | | |
|---|---|---|---|
| 3,331,798 | 7/1967 | Hibbard | 260/29.6 |
| 3,432,454 | 3/1969 | Hibbard | 260/29.6 |
| 3,551,556 | 12/1970 | Kliment et al. | 424/21 |
| 3,577,512 | 5/1971 | Shepherd et al. | 424/21 |
| 3,689,634 | 9/1972 | Kliment et al. | 424/21 |
| 3,775,537 | 11/1973 | Lehman et al. | 424/21 |

OTHER PUBLICATIONS

Stecher et al., Merck Index, 8th Ed., 1968, Merck & Co., Rahway, N.J., pp. 110–111, entry "Atropine–Sulfate".

*Primary Examiner*—Shep K. Rose
*Attorney, Agent, or Firm*—Pollock, Philpitt & Vande Sande

[57] ABSTRACT

A sustained release pharmaceutical composition which includes atropine sulfate and a polymer of a monomer mixture of a monoester of acrylic acid and/or methacrylic acid and a polyhydric alcohol; sulfur containing compound; and a diester of acrylic and/or methacrylic acid.

16 Claims, No Drawings

SUSTAINED RELEASE OF ATROPINE

BACKGROUND OF THE INVENTION

The present invention is concerned with a sustained release pharmaceutical composition, and in particular is concerned with a sustained release pharmaceutical composition which contains a water-insoluble but water-swellable hydrophilic polymer of a monomeric mixture containing a monoester of acrylic and/or methacrylic acid; sulfur containing compound; and a diester of acrylic and/or methacrylic acid.

It has previously been suggested to incorporate drugs into hydrophilic polymers to provide sustained release of the drug. Although a wide variety of suitable polymers and applicable drugs have previously been suggested, only a very limited number of combinations of particular drugs and particular polymers have to date been successful in providing sustained release characteristics. In addition, various combinations which provide sustained release require mixtures of substituents in combination with the drug.

It has become quite evident that not any combination of any drug and any hydrophilic polymer will provide a sustained release pharmaceutical composition. The preparation of sustained release pharmaceutical compositions from polymers and drugs is highly empirical. The art has not advanced to the stage where a person skilled in the art can predict whether a particular combination of a drug and hydrophilic polymer will produce a sustained release pharmaceutical composition.

Accordingly, it is an object of the present invention to provide a suitable sustained release pharmaceutical composition. It is a further object of the present invention to provide a sustained release pharmaceutical composition which requires only the pharmacological material and the hydrophilic polymer and does not require the presence of auxiliary constituents and particularly additional polymers.

SUMMARY OF THE INVENTION

The present invention is concerned with a sustained release pharmaceutical composition comprising:

A. a matrix of a water-insoluble but water-swellable hydrophilic polymer of a monomer mixture containing:
  1. polymerizable monoester of acrylic and/or methacrylic acid and a polyhydric alcohol;
  2. a polymerizable sulfur containing material selected from the group of polymerizable ethylenically unsaturated organic sulfonic acids; ammonium salts thereof; alkali metal salts thereof; and mixtures thereof; and
  3. diester of acrylic acid and/or methacrylic acid and a polyhydric alcohol;

wherein the monomer mixture contains from about 25 to about 94.5% by weight of (1); from about 5 to about 45% by weight of (2); and from about 0.5 to about 40% by weight of (3) based upon the total weight of (1), (2) and (3) in the monomer mixture; and B. atropine sulfate in an amount at least sufficient for the total dosage requirement during a treatment period; and being entrapped in said matrix.

DESCRIPTION OF PREFERRED EMBODIMENTS

The polymerizable monoesters which are suitable in obtaining the polymers employed in the present invention must be water-miscible. Such polymerizable monoesters are monoesters of either acrylic and/or methacrylic acid and a polyhydric alcohol and preferably a dihydric alcohol. Suitable dihydric alcohols which may be employed to form the esters used in the present invention include among others ethylene glycol, 1,3-propanediol, the dialkylene glycols such as diethylene glycol and dipropylene glycol; and the polyalkylene glycols such as polyethylene glycol and polypropylene glycol; 1,6-hexamethylene glycol; and 1,4-butanediol. Some suitable polyhydric alcohols which contain from 3 to 6 alcohol groups and which may be employed to form the ester used in the present invention include glycerol, trimethylol propane, trimethylolethane, pentaerythritol, and hexitols such as mannitol and sorbitol. Examples of some suitable polymerizable monoesters include 2-hydroxy ethyl methacrylate, 2-hydroxy ethyl acrylate, 2-hydroxy propyl methacrylate, diethylene glycol monomethacrylate, diethylene glycol monoacrylate, 2-hydroxy propyl acrylate, 3-hydroxy propyl methacrylate, 3-hydroxy propyl acrylate, dipropylene glycol monomethacrylate, glyceryl methacrylate, and pentaerythritol methacrylate, with the preferred polymerizable monoester being 2-hydroxy ethyl methacrylate. The amount of polymerizable monoester employed in the monomeric mixture to prepare the polymers of the present invention is usually from about 25 to about 94.5% by weight, and is preferably from about 35 to about 90% by weight, based upon the total weight of the polymerizable monoester, sulfur containing monomer, and diester. The most preferred amount of monoester is between about 40 and about 85% by weight based upon the total weight of the monoester, sulfur containing monomer, and diester.

The polymerizable sulfur containing material, employed in the polymers of the inner matrix include polymerizable ethylenically unsaturated organic sulfonic acids and/or ammonium salts thereof and/or alkali metal salts thereof such as sodium and potassium salts thereof. Illustrative of some polymerizable ethylenically unsaturated organic sulfonic acids include vinylsulfonic acid, vinylpropanesulfonic acid, and styrenesulfonic acids such as p-vinylbenzenesulfonic acid. The preferred acid is p-vinylbenzenesulfonic acid and the preferred polymerizable sulfur containing material is sodium p-vinylbenzenesulfonate.

The amount of polymerizable sulfur containing material is usually between about 5 and about 45% by weight, and is preferably between about 5 and 40% by weight, and is most preferably between about 10 and about 30% by weight based upon the total weight of the monoester, sulfur containing material and diester in the monomer mixture.

The polymerizable diesters employed in the present invention are diesters of acrylic and/or methacrylic acid and a polyhydric alcohol and preferably a dihydric alcohol. Illustrative of such diesters are ethylene glycol diacrylate, ethylene glycol dimethacrylate, 1,2-butylene dimethacrylate, 1,3-butylene dimethacrylate, 1,4-butylene dimethacrylate, propylene glycol diacrylate, propylene glycol dimethacrylate, diethylene glycol di-, methacrylate, dipropylene glycol dimethacrylate, diethylene glycol diacrylate, dipropylene glycol diacrylate, tetraethylene glycol dimethacrylate, and tetramethylene glycol diacrylate. The preferred diester is tetraethylene glycol dimethacrylate. The amount of diester employed is usually between about 0.5 and about 40%, preferably between about 1 and 30%, and most preferably between about 5 and about 25.5% by weight based upon the total weight of the monoester, sulfur containing monomer and diester.

The monomer mixture for obtaining polymers employed according to the present invention can contain from about 25 or from about 35 or from about 40 to about 44.4% by weight of the polymerizable monoester; from about 5 or from about 10 to about 30% by weight of the polymerizable sulfur-containing material; and from about 0.5 or from about 1 or from about 5 to about 25.2% by weight of the polymerizable diester based upon the total weight of the polymerizable monoester, polymerizable diester, and polymerizable sulfur-containing material in the monomer mixture.

Atropine sulfate, which is the drug employed according to the present invention, is generally used in amounts of about 0.1 to about 50%, preferably from about 0.5 to about 35% and most preferably from about 5 to about 30% by weight based upon the total weight of the atropine sulfate and the water-insoluble but water-swellable hydrophilic polymer. The water-insoluble but water-swellable hydrophilic polymer is generally employed in amounts of about 50 to about 99.9%, preferably from about 65 to about 99.5% by weight, and most preferably from about 70 to about 95% by weight based upon the total weight of the atropine sulfate and water-insoluble but water-swellable hydrophilic polymer.

In addition, the pharmaceutical compositions of the present invention can include such materials as plasticizers, inert fillers, and suspending aids for the atropine sulfate such as Cab-O-Sil and bentone.

Moreover, the compositions of the present invention can be further encapsulated by another polymeric or other film-forming substance according to particular applications of the composition. Such auxiliary encapsulating layers can be soluble or insoluble in aqueous medium, the solubility or swelling being dependent or independent of pH and/or ionic strength, and can be susceptible or non-susceptible to enzymatic action.

The pharmaceutical compositions of the present invention can be prepared by admixing the atropine sulfate or an aqueous solution thereof and the monomeric mixture containing the polymerizable monoester, sulfur containing monomer and diester; and then by polymerizing to provide a matrix of the water-insoluble but water-swellable polymer entrapping the atropine sulfate.

The pharmaceutical composition of the present invention can also be prepared by contacting the atropine sulfate with the water-insoluble but water-swellable polymer such as by immersing the polymer in a bath such as an aqueous bath of the drug to cause diffusion of the atropine sulfate into the polymer matrix. Generally the atropine sulfate is contacted with the polymer for at least about 15 minutes to cause diffusion into the polymer matrix. Of course, this can vary greatly depending upon the relative amount of the ingredients.

The water-swellable polymers employed in the present invention generally can be prepared by employing bulk polymerization techniques. The term "bulk polymerization" as used herein includes those polymerizations carried out in the absence of a solvent or dispersing liquid as well as those polymerizations carried out in the presence of water or water-soluble or polymer-soluble liquid swelling agents in such amounts as not to significantly alter the nature of the polymerization process.

The polymerization catalyst employed can be any of the catalysts which are suitable in polymerizing compounds containing ethylenic unsaturation and preferably are the free radical catalysts. Of particular interest are the peroxide catalysts. Some examples of suitable peroxide catalysts include hydrogen peroxide, benzoyl peroxide, tert-butyl peroctoate, phthalic peroxide, succinic peroxide, benzoyl acetic peroxide, tert-butyl peroxy pivalate, coconut oil acid peroxide, lauric peroxide, stearic peroxide, oleic peroxide, tert-butyl hydroperoxide, tetraline hydroperoxide, tert-butyl diperphthalate, cumene hydroperoxide, tert-butyl perbenzoate, acetyl peroxide, 2,4-dichlorobenzoyl peroxide, urea peroxide, caprylyl peroxide, p-chlorobenzoyl peroxide, ditert-butyl peroxide, 2,2-bis(tert-butyl peroxy)-butane, hydroxyheptyl peroxide, the diperoxide of benzaldehyde; alkylperoxycarbonates such as diisobutylperoxy bicarbonate, di-secondary butyl peroxy bicarbonate, and tert-butyl peroxyisopropylcarbonate, and the like. The preferred catalyst is one which is effective at moderately low temperatures such as at about 30°–90° C.

The amount of catalyst employed depends upon the type of catalyst system used and is generally from about 0.01 to about 10 parts by weight per 100 parts of the monomer mixture, and preferably is from about 0.1 to about 1 part by weight per 100 parts of the monomer mixture.

The polymerization is generally carried out at temperatures from about room temperature to about 150° C. It is generally preferred to initiate the polymerization at relatively low temperatures such as from about 35 to about 85° C and then to increase the temperature to about 90° to about 150° C as the reaction proceeds and preferably after most of the reaction has been completed. The most preferred initial temperature range of polymerization is between about 30° and 90° C.

Usually the polymerization is conducted under autogeneous pressure in a closed reaction vessel. However, any suitable means to prevent significant evaporation of any of the monomers can be employed.

Generally, the polymerization is completed in about one-half to about 12 hours and preferably is completed in about 4 to about 6 hours. It is understood, of course, that the time and temperature are inversely related. That is, temperatures employed at the upper end of the temperature range will provide polymerization processes which can be completed near the lower end of the time range.

In addition, it may be desirable for the co-polymers obtained from such polymerizations to be post cured at temperatures somewhat higher than those initially employed in the polymerization. Usually the temperatures employed in the post cure will range from about 90° to about 150° C. Two hours is usually more than sufficient for such a post curing operation. Preferably the post cure is completed in 2 to 4 hours.

The pharmaceutical compositions of the present invention can be utilized for oral ingestion, implantation, or external application to a mucous membrane. The pharmaceutical compositions of the present invention can be implanted subcutaneously, constitute a part of a prosthesis, or be inserted in a cavity of the human body. Upon application to the desired part of the body by the desired mode, the pharmaceutical compositions of the present invention provide sustained release of the pharmacological material by diffusion through pores of the water-insoluble but water-swellable polymeric matrix to the desired part of the body upon contact with body fluids.

The present invention makes it possible to obtain a sustained release pharmaceutical composition which requires only the drug and the water-insoluble but water-swellable polymer and does not require the presence of auxiliary polymers. In addition, the sustained release characteristics of the present invention could not be predicted particularly since the polymers employed in this invention did not always provide sustained release compositions.

Moreover when atropine sulfate is employed together with other polymers, a sustained release composition is not always obtained.

The following example is presented to further illustrate the present invention. All parts are by weight unless the contrary is stated.

EXAMPLE 1

A polymeric composition is prepared by admixing about 40 parts of water and about 100 parts of a polymerizable composition containing about 44.4% by weight of 2-hydroxy ethyl methacrylate, about 30% by weight of sodium p-vinylbenzenesulfonate, about 25.2% by weight of tetraethylene glycol dimethacrylate; and about 0.4% by weight of tert-butyl peroctoate. The mixture is heated to 55° C for about 12 hours under a nitrogen atmosphere of 20 psi to effect polymerization. The mixture is post cured by heating under atmospheric pressure at 80° C for 2 hours. About 66.6 parts of the resulting polymeric composition are soaked for about 12 hours at ambient temperature in about 5000 parts of an isotonic saline solution (0.9% NaCl) containing 99.4 mg of atropine sulfate per 5 ml of saline solution (0.9% NaCl). The above composition is introduced into a beaker containing 20 milliliters of isotonic saline solution (0.9% NaCl) and the beaker is shaken at a constant temperature of 37° C in a thermostatic water bath. The concentration of eluted atropine is determined with a Beckman DB-GT spectrophotometer using the maximum absorption of atropine sulfate at 205 nanometers. Elution rates are checked at the time intervals shown below and fresh isotonic saline solution is employed after each reading. The results are listed below.

| Time Hours | Mg of Atropine Eluted | % of Total Atropine Eluted |
|---|---|---|
| 1 | 6.78 | 39.0 |
| 2 | 3.29 | 18.9 |
| 3 | 1.74 | 10.0 |
| 4 | 1.54 | 8.9 |
| 5 | 0.92 | 5.3 |
| 6 | 0.82 | 4.7 |
| 8 | 1.10 | 6.3 |
| 9 | 0.34 | 2.0 |
| 24 | 0.83 | 4.8 |

What is claimed is:

1. A sustained release oral ingestion 24 hour atropine eluting pharmaceutical composition comprising:

A. a polymerized and cured matrix of water-insoluble but water-swellable hydrophilic polymer of a monomer mixture containing:
 1. polymerizable monoester of a member selected from the group consisting of acrylic acid, methacrylic acid, and mixtures thereof; and a polyhydric alcohol;
 2. a polymerizable sulfur containing material selected from the group consisting of vinyl sulfonic acid, vinylpropane sulfonic acid, styrene sulfonic acids; alkali metal salts thereof; ammonium salts thereof; and mixtures thereof; and
 3. polymerizable diester of a member selected from the group consisting of acrylic acid, methacrylic acid, and mixtures thereof; and a polyhydric alcohol; and wherein the monomer mixture contains from about 25 to about 44.4% by weight of (1); from about 5 to about 30% by weight of (2); and from about 0.5 to about 25.2% by weight of (3) based upon the total weight of (1), (2), and (3) in the monomer mixture; and B. said polymerized and cured matrix having been soaked for about 12 hours in isotonic saline solution containing per 5 ml of isotonic saline solution at least about 90.4 mg of atropine sulfate in an amount sufficient for the total dosage requirement adapted to gradually elute atropine upon oral ingestion during 24 hours of a treatment period; and thereby the atropine sulfate being entrapped in said matrix.

2. The composition of claim 1 wherein said polymerizable monoester is a monoester of a member selected from the group consisting of acrylic acid, methacrylic acid, and mixtures thereof; and a polyhydric alcohol selected from the group consisting of ethylene glycol, 1,3-propanediol, diethylene glycol, dipropylene glycol, polyethylene glycol, polypropylene glycol, 1,6-hexamethylene glycol, 1,4-butanediol, glycerol, trimethylol propane, trimethylolethane, pentaerythritol, mannitol, and sorbitol.

3. The composition of claim 1 wherein said polymerizable monoester is selected from the group consisting of 2-hydroxy ethyl methacrylate, 2-hydroxy ethyl acrylate, 2-hydroxy propyl methacrylate, diethylene glycol monomethacrylate, diethylene glycol monoacrylate, 2-hydroxy propyl acrylate, 3-hydroxy propyl methacrylate, 3-hydroxy propyl acrylate, dipropylene glycol monomethacrylate, glyceryl methacrylate, and pentaerythritol methacrylate.

4. The composition of claim 1 wherein said monoester is 2-hydroxy ethyl methacrylate.

5. The composition of claim 1 wherein said diester is selected from the group consisting of ethylene glycol diacrylate, ethylene glycol dimethacrylate, 1,2-butylene dimethacrylate, 1,3-butylene dimethacrylate, 1,4-butylene dimethacrylate, propylene glycol diacrylate, propylene glycol dimethacrylate, diethylene glycol dimethacrylate, dipropylene glycol dimethacrylate, diethylene glycol diacrylate, dipropylene glycol diacrylate, tetraethylene glycol dimethacrylate, and tetraethylene glycol diacrylate.

6. The composition of claim 1 wherein said diester is tetraethylene glycol dimethacrylate.

7. The composition of claim 1 wherein said polymerizable sulfur-containing material is selected from the group consisting of styrene sulfonic acids, ammonium salts thereof, alkali metal salts thereof; and mixtures thereof.

8. The composition of claim 7 wherein the styrene sulfonic acid is p-toluene sulfonic acid.

9. The composition of claim 1 wherein said polymerizable sulfur-containing material is sodium p-toluene sulfonic acid.

10. The composition of claim 1 wherein the monomer mixture contains from about 35 to about 44.4% by weight of (1); from about 5 to about 30% by weight of (2); and from about 1 to about 25.2% by weight of (3) based upon the total weight of (1), (2), and (3) in the monomer mixture.

11. The composition of claim 1 wherein the monomer mixture contains from about 40 to about 44.4% by weight of (1); from about 10 to about 30% by weight of (2); and from about 5 to about 25.2% by weight of (3) based upon the total weight of (1), (2), and (3) in the monomer mixture.

12. The composition of claim 1 wherein (1) said polymerizable monoester is a monoester of a member selected from the group consisting of acrylic acid, methacrylic acid, and mixtures thereof; and a polyhydric alcohol selected from the group consisting of ethylene glycol, 1,3-propanediol, diethylene glycol, dipropylene glycol, polyethylene glycol, polypropylene glycol, 1,6-hexamethylene glycol, 1,4-butanediol, glycerol, trimethylol propane, trimethylolethane, pentaerythritol, mannitol, and sorbitol; wherein said polymerizable sulfur-containing material is selected from the group consisting of styrene sulfonic acids, ammonium salts thereof, alkali metal salts thereof, and mixtures thereof; and wherein said diester (3) is selected from the group consisting of ethylene glycol diacrylate, ethylene glycol dimethacrylate, 1,2-butylene dimethacrylate, 1,3-butylene dimethacrylate, 1,4-butylene dimethacrylate, propylene glycol diacrylate, propylene glycol dimethacrylate, diethylene glycol dimethacrylate, dipropylene glycol dimethacrylate, diethylene glycol diacrylate, dipropylene glycol diacrylate, tetraethylene glycol dimethacrylate, and tetraethylene glycol diacrylate.

13. The composition of claim 12 wherein said polymerizable monoester is selected from the group consisting of 2-hydroxy ethyl methacrylate, 2-hydroxy ethyl acrylate, 2-hydroxy propyl methacrylate, diethylene glycol monomethacrylate, diethylene glycol monoacrylate, 2-hydroxy propyl acrylate, 3-hydroxy propyl methacrylate, 3-hydroxy propyl acrylate, dipropylene glycol monomethacrylate, glyceryl methacrylate, and pentaerythritol methacrylate; and wherein the styrene sulfonic acid is p-toluene sulfonic acid.

14. The composition of claim 13 wherein the monomer mixture contains from about 35 to about 44.4% by weight of (1); from about 5 to about 30% by weight of (2); and from about 1 to about 25.2 by weight of (3) based upon the total weight of (1), (2), and (3) in the monomer mixture.

15. The composition of claim 1 wherein said monoester (1) is 2-hydroxy ethyl methacrylate; said sulfur-containing monomer (2) is sodium p-toluene sulfonic acid; and said diester (3) is tetraethylene glycol dimethacrylate.

16. The composition of claim 15 wherein the monomer mixture contains from about 35 to about 44.4% by weight of (1); from about 5 to about 30% by weight of (2); and from about 1 to about 25.2% by weight of (3) based upon the total weight of (1), (2), and (3) in the monomer mixture.

* * * * *